United States Patent Office 3,672,975
Patented June 27, 1972

3,672,975
COPOLYMERIZATION OF POLYACRYLIC ACID WITHIN NYLON STRUCTURES
Gilbert N. Arons, Newton Highlands, Mass., assignor to the United States of America as represented by the Secretary of the Army
No Drawing. Filed June 9, 1970, Ser. No. 44,873
Int. Cl. B44d 5/12
U.S. Cl. 117—118
8 Claims

ABSTRACT OF THE DISCLOSURE

Copolymerization of polyacrylic acid within a nylon structure is accomplished by diffusing an aqueous solution of acrylic acid polymer, having a molecular weight range of from 2000 to 20,000 and at a pH of from 1.5 to 3.5, under elevated temperatures into the nylon structure, drying, and thereafter heat curing said diffused acrylic acid polymer to effect copolymerization with the nylon.

The invention described herein may be manufactured, used, and licensed by or for the Government for governmental purposes without the payment to me of any royalty thereon.

BACKGROUND OF THE INVENTION

This invention relates to the chemical modification of nylon structures to improve or modify certain properties of such structures. More particularly, this invention relates to the copolymerization of an acrylic acid polymer within a nylon structure to modify the properties of the nylon.

Nylon structures such as shaped rigid objects, flexible films, and fibers are common items of commerce finding widespread application because of the generally desirable properties of the nylon material. Nylon fibers, for example, are known to have many excellent properties, suitable for many textile applications, such as high levels of tenacity, wet strength, elongation, elasticity, flexibility, abrasion resistance and resistance to microbiological deterioration. Nylon, however, has two properties which are detrimental for many textile applications. One detrimental property is low moisture sorption which negates garment comfort in hot, humid environments. The other is a low melting point of 258° C. which affords little thermal protection and can cause severe skin burns during exposure to thermal conditions in excess of the melting point.

It is known that the grafting of polyacrylic acid to nylon reduces these detrimental properties, in that the salts, preferably sodium, potassium and calcium, of the grafted polymer increase significantly the moisture sorption and the calcium salt increases significantly the fiber melt temperature. It is known in the art to form polyacrylic acid grafts within nylon by diffusing an acrylic acid monomer within the nylon structure and causing the monomer to homopolymerize and to graft to the nylon simultaneously. This technique is undesirable because of the special conditions and equipment required to effect polymerization and grafting of the monomer. It is also known to chemically combine a surface finish of completely polymerized polyacrylic acid to nylon by means of heat curing. Such polymers are normally applied as surface finishes to nylon warp yarns as a water removable size; however, these polymers can permanently stiffen textiles if a heat cure is applied to the surface finish.

A. C. Nuessle in his article "Acrylics in Textile Applications" appearing in Chemistry and Industry, 1966, pages 1580–1594 points out on page 1581 that polymers containing more than a few monomer units cannot penetrate textile fibers—not even hydrophilic fibers such as cotton—and are thus restricted to the surface, where they tend to bind fibre-to-fibre and yarn-to-yarn. The lack of penetration of the polymer into the nylon fiber is a serious drawback in that it limits the quantity of total add-on of the polymer to that which can be achieved by chemical combination to the surface of the nylon fiber and results in the aforementioned fibre-to-fibre and yarn-to-yarn bonds which produce stiff, brittle materials. This lack of polymer penetration is unfortunate since the application of homopolymers to nylon would otherwise be compatible with equipment found in textile wet finishing plants. The art of chemically modifying nylon fibers and other nylon structures would be greatly advanced if some way were found to copolymerize substantially uniformly throughout the structure a preformed polyacrylic acid.

SUMMARY

This invention relates to a process of chemically modifying a nylon structure wherein a preformed polymer of acrylic acid is caused to be copolymerized within said structure. More particularly, this process effects substantial penetration of a polymer of acrylic acid into nylon structures and especially nylon fibres, a feat thought not to be possible by those skilled in the art, by precise control of the molecular weight of the polymer, and the pH of the polymer solution.

DESCRIPTION OF THE PREFERRED EMBODIMENTS

The nylon structures which may be modified in accordance with the present invention are formed out of any of those types of nylon, presently known in the art, including but not limited to such types as nylon 6, 66, and 11. Nylon in the form of rigid objects, flexible sheets, and especially fibres whether in that form or as yarn or as woven or nonwoven fabrics may be chemically modified as described herein. In the case of fibres, the fact that the fibres will vary in diameter or may be delustered by a pigment will not have any significant effect on their suitability for use in the present invention. While the invention hereafter will be described in terms of modification of nylon fibres, it is understood that this invention is equally applicable to other nylon structures.

Those preformed polyacrylic acids which have been found to be suitable for uses in the present invention include either homopolymers of acrylic or methacrylic acid. It is essential that the aforementioned polymers have molecular weights in the range of 2000 to 20,000. Such polymers are completely water soluble and are available in aqueous solutions having various solids contents.

It has been discovered that in order to bring about significant diffusion of the acrylic polymer into the nylon structure or fiber, it is necessary to maintain a pH of the diffusing solution within the range of 1.5 to 3.5. While the precise mechanism involved in the effect of pH on the ability of the polymers to diffuse into nylon is not completely understood, it is theorized that these low pH values influence in some manner the nylon and the acrylic polymers to allow diffusion which would not occur at higher pH values. For example, it is theorized that the pH values specified may (1) reduce hydrogen bonding between adjacent nylon molecules thereby increasing the intermolecular distances and thereby generating larger diffusion channels, (2) reduce hydrogen bonding between adjacent polyacrylic acid molecules thereby giving a narrower configuration for diffusion, and (3) reduce hydrogen bonding between polyacrylic acid molecules and nylon molecules and thereby eliminate an obstacle to diffusion. It is also thought that at these pH values the polyacrylic molecule has a coiled molecular configuration, the geometry of which may be more compatible with diffusion. At pH levels below 1.5, however, the nylon experiences a significant loss in many of its desirable physical properties.

The diffusion of the polyacrylic acid into nylon is preferably accomplished at elevated temperatures to increase the rate of diffusion. It has been found that temperatures within the range of 80° C. to 150° C. are desirable. Diffusion to produce fixation add-on weights of from 1% to 18% of the acrylic polymer have been achieved under the above conditions in time periods of from 1 to 5 hours.

Following the diffusion of the polyacrylic acid, the nylon is removed from the diffusing solution and surface liquid is removed by a hydro-extraction procedure with squeeze rolls or a centrifuge. The treated nylon is then dried at temperatures up to 105° C. to a constant weight to remove substantially all moisture therefrom.

Chemical combination of the diffused polyacrylic acid to the nylon material is accomplished by heat curing which results in copolymerization which has been found to involve both graft copolymerization and block copolymerization. The heat curing conditions range from 150° C. to 218° C. for time intervals ranging from 0.4 minutes to 60 minutes. At higher temperatures, the strength of the nylon will be severely diminished.

After curing, the unfixed non-copolymerized polyacrylic acid is removed by scouring. Since the polyacrylic acid is water soluble, hot water is an excellent solvent for the polymer. For more rapid results, scouring temperatures preferably range from 70° C. to 100° C. Unreacted polymer was found to be substantially removed by scouring samples 3 times. Additional scourings produced insignificant weight losses, indicating that substantially all unreacted polymer is removed by the third scour. The amount of permanent add-on or percent of polymer fixed to nylon was calculated by comparing the weight of the original material with that finally produced.

The existence of a copolymer of polyacrylic acid and nylon was estblished by dissolving all unreacted nylon leaving only the copolymer. Nylon was completely dissolved in 2,2,2-trifluoroethanol. The isolated product free of unmodified nylon was insoluble in 2,2,2-trifluoroethanol, a solvent for nylon, and insoluble in water, a solvent for polyacrylic acid. Differential scanning calorimeter plots of the remaining residue were found to be free of the characteristic nylon and polyacrylic acid endotherms. Infrared spectra also provided evidence of the existence of a nylon-polyacrylic acid bonding. The location of the copolymerized polyacrylic acid with respect to the nylon fiber was determined by staining cross sections of yarn with a cationic dye that would react with carboxyl groups from the copolymerized polyacrylic acid and examining under high power mangnification. Such examination demonstrated that the polyacrylic acid had diffused within the nylon fibers prior to copolymerization in situ.

Polyacrylic acid appears to attach to the terminal amine groups of the nylon since a significant reduction in fixation is observed following a blocking of the amine end groups. The remaining fixation occurs along the nylon polymer chain probably at the amide sites by a process of imide formation.

The practice of this invention will be described in greater detail in the following examples.

Example 1

A plain weave nylon 66 fabric weighing 6.74 oz./sq. yd., containing 38 ends and 36 picks of spun staple yarn was purified by intensive scouring in a jig with an alkaline non-ionic surfactant solution for two hours at 79° C. The solution contained 0.05% of the surfactant by weight and sufficient sodium carbonate to obtain a pH of 11. This scour was followed by repeated rinsing to a neutral pH, hydroextraction and drying. 2 x 12 inch samples of the fabric were heated to constant weight at 105° C. The dried and weighed samples were immersed in 50 ml. of a polyacrylic acid (PAA) aqueous solution having 28% solids, a pH of 1.6, and a PAA molecular weight of 15,000 to 20,000. The immersed samples were heated at 121° C. for two hours in an autoclave with approximately 25 minutes additional time allowed for slow exhaustion of the autoclave chamber. The excess surface solution was removed from the samples by passing them through two nips of a laboratory pad. The samples were dried at 100° C. for 20 minutes. The dried samples were then cured by heating at 177° C. for ten minutes in an air circulating oven.

Unfixed PAA were then removed from the samples by extraction with hot (95° C.) water in a glass extraction thimble. The extraction with hot water continued for 15 minutes and was followed by a rinsing with distilled water. The scouring and rinsing was repeated twice more. Samples, still in the thimbles, were then passed through three extended cycles of scouring at 95° C. for one hour and rinsing. The samples were dried to constant weight at 105° C. and the sample weight gain determined by difference. The maximum percent of copolymerized material, based on the original dry sample weight, was found to be 6.5.

An examination into the nature of the copolymerized nylon material was accomplished by removing all unreacted nylon material with 2,2,2-trifluoroethanol. The extraction was accomplished in a soxhlet apparatus equipped with a cellulose extraction thimble and a drying tube. The extraction was continued until the product was free of nylon, determined by the fact that no precipitate formed on diluting the last trifluoroethanol extract with water. The residue (copolymerized PAA and nylon) was rinsed with 75 ml. of ethanol and evaporated to dryness on a steam bath. Thermal analysis of the isolated product was accomplished with a Perkin-Elmer DSC-1 differential scanning calorimeter equipped with a recorder and operated with nitrogen used as the purging gas. The differential scanning calorimeter plots were found to be free of the characteristic nylon 66 endotherm at 258° C. and to have endotherm peaks in the vicinity of 230° C. and 337° C. which are not characteristic of nylon. Similarly, there was no unreacted PAA present since the broad endotherm characteristic of PAA above 130° C. was also absent.

Infrared spectra for the isolated product were obtained using a Beckman Model IR 9 Spectrophotometer using KBr pellets with an air reference. These showed a basic nylon 66 plot with an extra carbonyl band at the 1730 cm.$^{-1}$ region which can be attributed only to copolymerized polyacrylic acid. The change in the basic plot could only be produced by the addition of a considerable number of carboxylic groups to the nylon since small amounts of carboxylic groups would have been undetected.

To locate the polyacrylic grafts within the nylon fiber, advantage was taken of the fact that the carboxyl group of the polyacrylic acid reacts with cationic dyestuffs to produce an intense stain. Several yarns of nylon copolymerized according to this example were embedded in mounting media and cut into 20 micron thick cross-sections. The cross-sections were stained for 4 hours at room temperature in a 30 ml. bath of 0.0010 percent Malachite Green (91 percent pure) buffered at pH 7.0 and were then rinsed and dried. Microscopic examination of the cross-sections were made at 440x using mineral oil as a mounting media. The PAA copolymerized nylon areas were heavily stained throughout the fiber whereas the untreated nylon control was unstained. Smaller diameter fibers were more completely penetrated by the PAA, however, while large diameter fibers did not show as complete penetration they did exhibit deep penetration.

Example 2

Nylon fabric samples were treated with PAA solutions in the same manner as set forth in Example 1. The pH of the PAA solution, however, for each sample was varied as set forth in Table 1. The results set forth below in Table 1 show that polyacrylic acid fixation to nylon is governed critically by the pH of the diffusing solution.

No significant chemical combination after diffusion, drying, and curing occurs until the solution pH is reduced below 3.5. Control samples showed a constant slight loss in weight.

TABLE 1.—RELATIONSHIP OF pH TO FIXATION OF POLYACRYLIC ACID ON NYLON

| Treatment solution | pH | Average PAA fixation (percent) |
|---|---|---|
| PAA | 5.5 | −0.6 |
|  | 5.2 | −0.3 |
|  | 4.5 | −0.4 |
|  | 4.0 | 0.5 |
|  | 3.5 | 0.7 |
|  | 3.0 | 2.1 |
|  | 2.5 | 3.8 |
|  | 2.0 | 5.9 |
|  | 1.6 | 5.7 |
| Water (Control) | 5.2 | −0.8 |
| $H_2SO_4$ (Control) | 3.0 | −0.7 |
|  | 1.6 | −0.7 |

Example 3

Nylon fabric sample were treated with a PAA aqueous solution having 25% solids, a pH of 1.9 and a PAA molecular weight of 5250 in the same manner as set forth in Example 1. The percent of copolymerized material based upon the original dry sample weight was found to be 11.

Example 4

Nylon samples were prepared in accordance with the procedure set forth in Example 1 to achieve a 6.5 percent by weight PAA fixation. The sodium salt of the PAA fixed to the nylon was formed by boiling the sample for one hour in a 1.0 percent solution of sodium carbonate at a 25:1 bath ratio, rinsing until a neutral water pH is reached and drying. The calcium salt was formed by boiling for one hour a sample in a 1.0 percent solution of calcium acetate at a 25:1 bath ratio, followed by rinsing, until a neutral water pH is reached and drying.

Moisture regain of each of the acid form, sodium salt and calcium salt of the nylon fabric fixed with PAA was determined. The samples were first dried to constant weight at 105° C. and then conditioned to constant weight at 70° F. and 50 percent relative humidity. Moisture regain was 2.5 percent for the acid form, 5.5 percent for the sodium salt and 4.8 percent for the calcium salt. The sodium and calcium salts produced moisture regain results that indicate that as little as 6.5 percent PAA fixation produce nylon products which compare favorably with cotton, a hydrophilic material. Under the same conditions, cotton has a regain of approximately 4.5 percent.

Example 5

The calcium salt of the PAA modified nylon fabric obtained in Example 4 was examined with respect to its thermal properties. Since this fabric has a melting point above 300° C., beyond the temperature limits of ordinary apparatus, it was necessary to evaluate the melting point using the Perkin-Elmer DSC–1 differential scanning calorimeter. The sample was placed in an aluminum cup with a crimped lid having a small viewing hole. Observations were made during heating in a nitrogen atmosphere. Slight darkening of the fabric occurs at 340° C. and the intensity of the darkening gradually increases as the temperature is raised. At 375° C. the fabric structure is still intact. At 385° C. the fabric did not show significant melting tendencies. The small quantity of melted material at this temperature is thought to be unmodified nylon. Unmodified nylon fabric by comparison has a melting point of 258° C.

Example 6

Four 2 x 12 inch samples of nylon, weighing 14 g., were boiled in 140 ml. of acetic anhydride in 450 ml. of benzene at 86° C. for 112 hours to acetylate the terminal amine groups of the nylon. Acetic anhydride was removed by boiling for one hour and rinsing twice in anhydrous ether. This procedure was followed by two cold water rinses and a 30 minute boiling water rinse. The samples were then fixed with PAA as in Example 1 using the same pH 1.6 PAA solution. The percent fixed PAA was 4.4, a reduction of 23 percent from the 5.7 percent figure obtained for a non-acetylated sample. When using a PAA solution with a pH of 3.0, the acetylated nylon had a 0.8 percent PAA fixation whereas the non-acetylated sample had a 2.2 percent fixation. This reduction in fixation establishes that the nylon amine end groups did react with the PAA. The 4.4% PAA add-on was due to fixation of PAA to other sites on the nylon probably by imide formation.

Having described my invention as related to the embodiment set out herein, it is my intention that the invention not be limited by any of the details of description, unless otherwise specified, but rather be construed broadly within its spirit and scope as set out in the accompanying claims.

I claim:

1. A process for modifying the properties ot a nylon structure by causing preformed polyacrylic acid molecules to chemically combine with said nylon within said structure which comprises.
    (a) combining a nylon structure with an aqueous solution of a preformed polyacrylic acid, said solution having a pH of from 1.5 to 3.5 and said polyacrylic acid having a molecular weight in the range of from 2,000 to 20,000, maitaining said nylon structure is said polyacrylic acid solution for a period of from 1 to 5 hours at solution temperatures of from 80° C. to 150° C. to diffuse said polyacrylic acid within said structure,
    (b) removing said structure from said solution after the desired diffusion is accomplished, extracting excess surface liquid from said structure and thereafter drying said strtcure,
    (c) heat curing said polyacrylic said impregnated nylon structure to fix said polyacrylic acid to said nylon structure at a temperature of from 150° C. to 218° C. for a period of from 0.4 minute to 60 minutes, and
    (d) scouring said heat cured nylon structure to remove all unreacted polyacrylic acid.

2. A process according to claim 1 wherein said nylon structure is scoured with water having a temperature of at least 70° C.

3. A process according to claim 2 wherein said polyacrylic acid is a homopolymer of acrylic acid.

4. A process according to claim 3 wherein the total add-on of said copolymerized polyacrylic acid is from 1% to 18% by weight based on the original weight of the structure.

5. A process according to claim 4 wherein said nylon structure consists of nylon fibres.

6. A process according to claim 5 which comprises the additional step of forming a salt of said polyacrylic acid fixed to said nylon.

7. A process according to claim 6 wherein said salt is sodium.

8. A process according to claim 6 wherein said salt is calcium.

References Cited

UNITED STATES PATENTS

| 3,140,227 | 7/1964 | Roth | 117—138.8 N |
| 3,297,471 | 1/1967 | Traumann | 117—118 |

ALFRED L. LEAVITT, Primary Examiner

J. A. BELL, Assistant Examiner

U.S. Cl. X.R.

8—115.5; 117—138.8 N, 161 UZ; 260—857 G